US009235696B1

(12) United States Patent
Nien et al.

(10) Patent No.: US 9,235,696 B1
(45) Date of Patent: Jan. 12, 2016

(54) USER AUTHENTICATION USING A PORTABLE MOBILE DEVICE

(71) Applicants: Tzu-yi Nien, Taipei (TW); Nu Yu Ku, Taipei (TW); Yuan-Kai Hsiung, Taipei (TW); Yi-Jhen Yang, Taipei (TW)

(72) Inventors: Tzu-yi Nien, Taipei (TW); Nu Yu Ku, Taipei (TW); Yuan-Kai Hsiung, Taipei (TW); Yi-Jhen Yang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 62 days.

(21) Appl. No.: 13/890,034

(22) Filed: May 8, 2013

Related U.S. Application Data

(60) Provisional application No. 61/670,254, filed on Jul. 11, 2012.

(51) Int. Cl.
*G06F 21/31* (2013.01)
(52) U.S. Cl.
CPC ................................ *G06F 21/313* (2013.01)
(58) Field of Classification Search
None
See application file for complete search history.

(56) References Cited

U.S. PATENT DOCUMENTS

| | | | | |
|---|---|---|---|---|
| 2003/0134615 A1* | 7/2003 | Takeuchi | ............... | G06Q 20/02 455/411 |
| 2005/0047579 A1* | 3/2005 | Salame | ............. | H04L 29/06027 379/265.09 |
| 2005/0091490 A1* | 4/2005 | Ogura | ..................... | G06F 21/34 713/165 |
| 2008/0086770 A1* | 4/2008 | Kulkarni | ............. | H04L 63/0876 726/20 |
| 2008/0098464 A1* | 4/2008 | Mizrah | ................... | G06F 21/36 726/5 |
| 2010/0205448 A1* | 8/2010 | Tarhan | ..................... | G06F 21/33 713/185 |
| 2012/0095822 A1* | 4/2012 | Chiocchi | ............ | G06Q 30/0207 705/14.26 |
| 2012/0150598 A1* | 6/2012 | Griggs | ................... | G06Q 30/06 705/14.16 |
| 2013/0031623 A1* | 1/2013 | Sanders | .................. | G06F 21/34 726/19 |

(Continued)

OTHER PUBLICATIONS

Bhuta et al., Smart phone based Authentication and Authorization Protocol for SPACS, copyright 2102, IEEE.*

(Continued)

*Primary Examiner* — Jeffrey Pwu
*Assistant Examiner* — Baotram Tran
(74) *Attorney, Agent, or Firm* — Okamoto & Benedicto LLP

(57) ABSTRACT

User authentication is performed using a system that includes a service provider system, a device provisioning system, a user computer, and a portable mobile device. The user computer requests the service provider system for access to a remote online service. The user computer receives sign-in information from the device provisioning system. The sign-in information is transferred from the user computer to the portable mobile device, which provides the sign-in information and a unique device identifier of the portable mobile device to the device provisioning system. The device provisioning system identifies a user associated with the portable mobile device, and informs the service provider system the identity of the user. The service provider system allows the user computer to access the remote online service based on the identity of the user provided by the device provisioning system.

10 Claims, 3 Drawing Sheets

(56) References Cited

U.S. PATENT DOCUMENTS

| | | | | |
|---|---|---|---|---|
| 2013/0049928 | A1* | 2/2013 | Moore | G07C 11/10 340/5.51 |
| 2013/0110728 | A1* | 5/2013 | Kobres | G06Q 30/06 705/75 |
| 2013/0111208 | A1* | 5/2013 | Sabin | G06F 21/35 713/171 |
| 2013/0222583 | A1* | 8/2013 | Earnshaw | H04N 1/00148 348/143 |
| 2013/0311768 | A1* | 11/2013 | Fosmark | G06Q 20/3223 713/155 |
| 2013/0346164 | A1* | 12/2013 | Ramamurti | G06Q 30/02 705/12 |

OTHER PUBLICATIONS

Ficco et al., A Bluetooth Infrastructure for Automatic Service Access in Ubiquitous and Nomadic Computing Environments, copyright 2007, ACM.*

Maiorana et al., Keystroke Dynamics Authentication for Mobile Phones, copyright 2011, ACM.*

Boukerche et al., Applying Symetric and Asymetric Key Algorithms for the Security in Wireless Networks: Proff of Correctness, copyright 2010, ACM.*

Mizuno et al., Authentication Using Multiple Communication Channels, copyright 2005, ACM.*

* cited by examiner

USER AUTHENTICATION USING A PORTABLE MOBILE DEVICE

REFERENCE TO RELATED APPLICATION

This application claims the benefit of U.S. Provisional Application No. 61/670,254, filed on Jul. 11, 2012.

BACKGROUND OF THE INVENTION

1. Field of the Invention

The present invention relates generally to computer security, and more particularly but not exclusively to methods and apparatus for user authentication.

2. Description of the Background Art

User authentication becomes more critical as more remote online services are moved to the cloud. Currently, the most commonly used authentication process involves usernames and passwords. However, username and password-based user authentication does not provide sufficient security and is not user-friendly. Simple passwords could be easily cracked or guessed, while strong passwords are difficult to remember and input. Worse, some web servers even require multiple passwords for security reasons. Other authentication processes employ secondary factors, such as sending one-time-passwords via short message service (SMS) or a dedicated device that generates session-based passcodes. However, these secondary factors add extra steps that need to be performed by users, thereby negatively affecting the user experience, and may still not adequately address security issues. For example, malicious software, such as key loggers or malicious browser plug-ins, may be able to steal usernames, passwords, and other credentials when manually entered by the user. Furthermore, because usernames and passwords are easily copied and replicated, service providers are unable to tell with a good degree of certainty whether a person that presents these credentials is actually an authorized user.

User authentication may also be performed by using one device to logon to the online service on one communication channel and another device to present user credentials for authentication on another channel. For example, private keys and usernames may be stored at a smartphone, which sends the service provider a session identifier that is cryptographically signed using the private key. This presents a potential security risk because stolen or lost smartphones could be cracked to acquire private keys and usernames. Another concern is that this approach does not provide sufficient flexibility when a user has multiple accounts to an online service. Furthermore, it is normal for a user to have more than one smartphone. If private keys and usernames are stored in one smart phone, having a secondary backup device for identification becomes impossible.

SUMMARY

In one embodiment, user authentication is performed using a system that includes a service provider system, a device provisioning system, a user computer, and a portable mobile device. The user computer requests the service provider system for access to a remote online service. The user computer receives sign-in information from the device provisioning system. The sign-in information is transferred from the user computer to the portable mobile device, which provides the sign-in information and a unique device identifier of the portable mobile device to the device provisioning system. The device provisioning system identifies a user associated with the portable mobile device, and informs the service provider system the identity of the user. The service provider system allows the user computer to access the remote online service based on the identity of the user provided by the device provisioning system.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
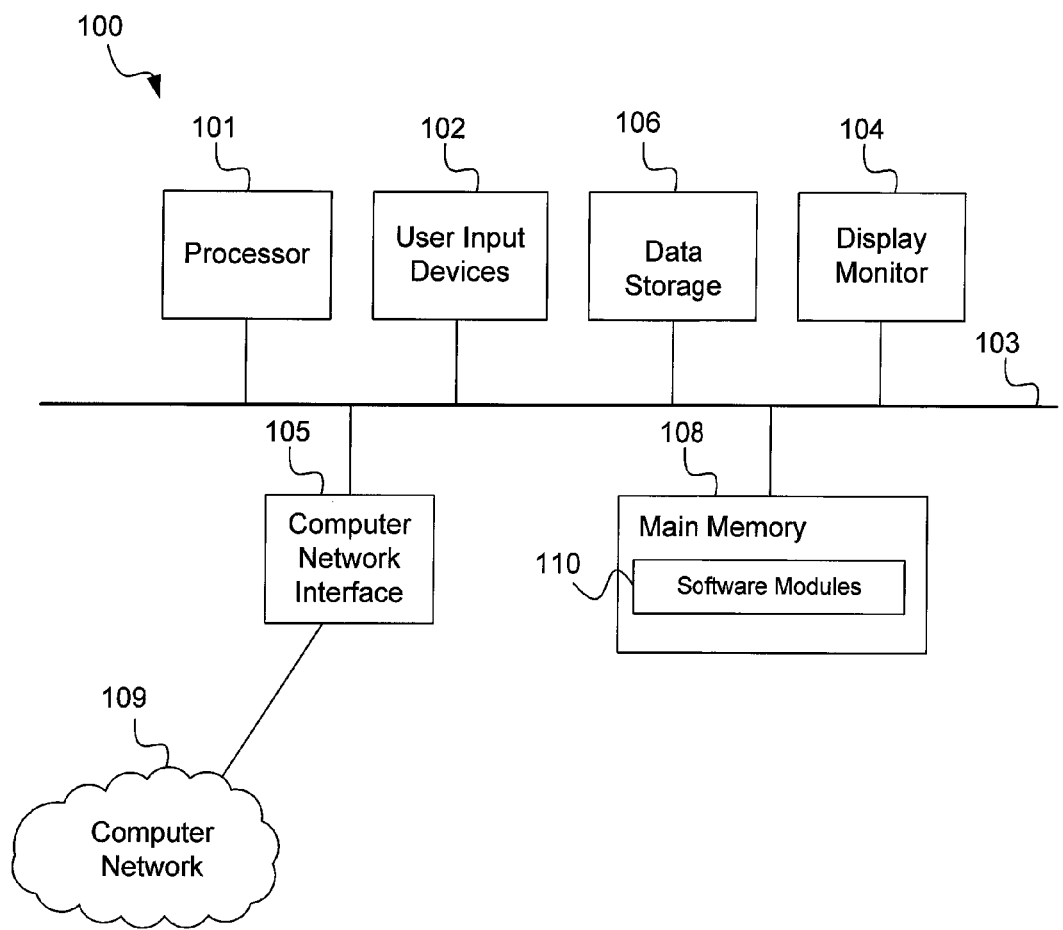
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a user computer 210, a portable mobile device 220, a service provider system 230, and a device provisioning system 240 (see FIG. 2). The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse, camera), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., wired or wireless network adapter, modem, cellular interface), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by a processor 101. As an example, the software modules 110 may comprise client software 211 when the computer 100 is employed as a user computer 210 (see FIG. 2). As another example, the software modules 110 may comprise an authentication agent 221 when the computer 100 is employed as a portable mobile device 220.

The computer 100 may be configured to perform its functions by executing the software modules 110. The software modules 110 may be loaded from the data storage device 106 to the main memory 108. The software modules 110 may also be made available on other computer-readable storage medium including optical disk, flash drive, and other memory devices.

Figure 2:
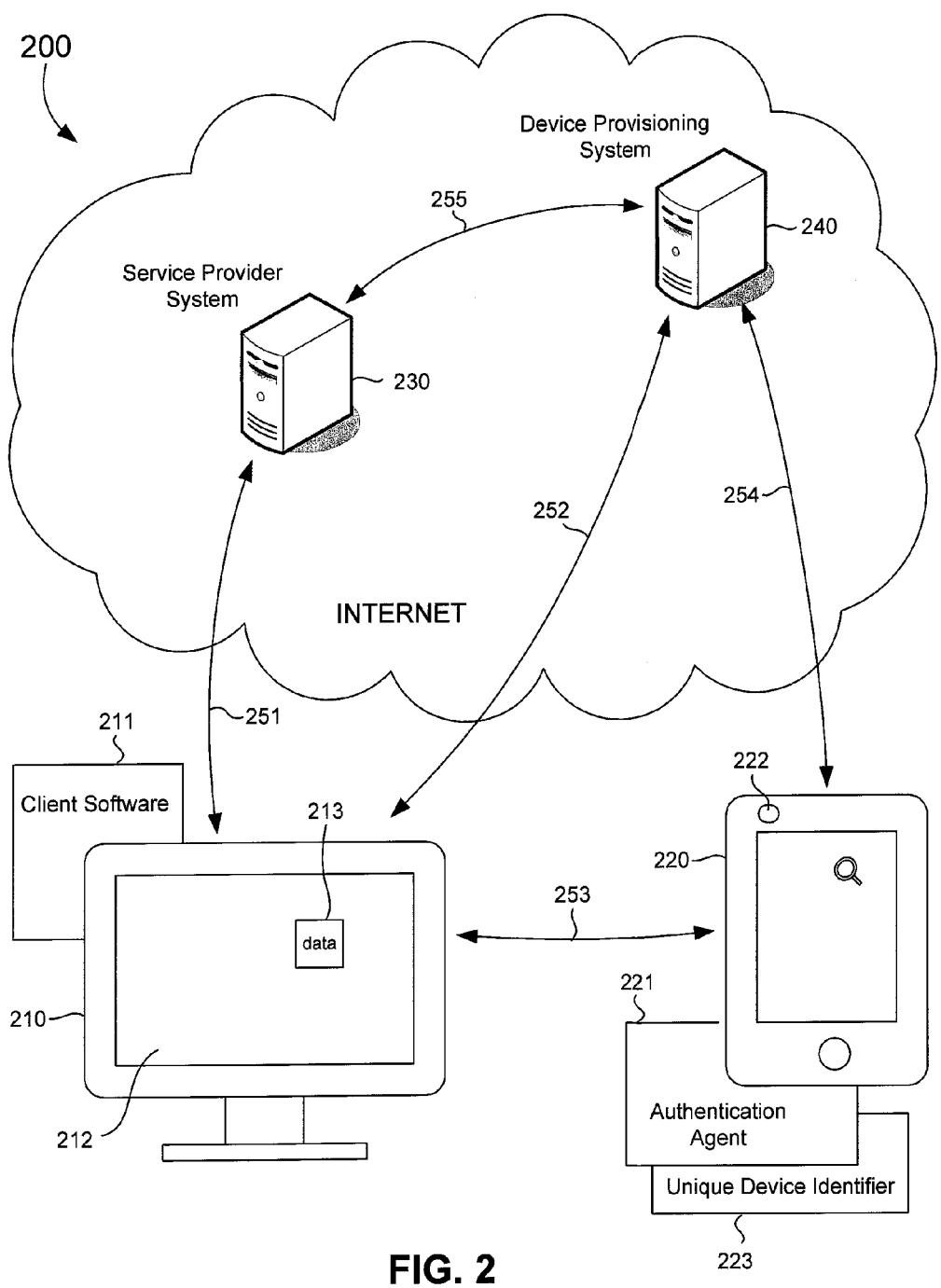
FIG. 2 shows a system for authenticating a user in accordance with an embodiment of the present invention.

FIG. 2 shows a system 200 for authenticating a user in accordance with an embodiment of the present invention. In the example of FIG. 2, the system 200 includes a user computer 210, a portable mobile device 220, a service provider system 230, and a device provisioning system 240. The components of the system 200 may communicate over the Internet. In the example of FIG. 2, the Internet connections 251, 252, 254, and 255 are separate Internet connections for improved security. This allows for access request on one communications channel (e.g., Internet connection 251) and authentication to be performed using other communications channels (e.g., Internet connections 252, 254, and 255).

A service provider system 230 may comprise one or more computers that provide remote online services on the Internet. As can be appreciated, there are numerous service providers on the Internet but only one is shown in FIG. 2 for clarity of illustration. The service provider system 230 may provide various online services including financial, data storage, web hosting, e-commerce, cloud-based services, and so on. The service provider system 230 requires user authentication before a user computer can access its service. That is, the service provider system 230 may verify that the user employing the user computer 210 is an authorized user of the service before allowing access to the service. In one embodiment, the service provider system 230 receives an access request from a user computer 210 over the Internet connection 251, directs the user computer 210 to get sign-in information from the device provisioning system 240 in response to receiving the access request, receives information about the identity of the user from the device provisioning system 240 over the Internet connection 255, and provides access to its services to the user computer 210 when the user is an authorized user. The sign-in information may comprise information for user authentication. As will be more apparent below, the portable mobile device 220 may present the sign-in information and device identifier 223 to the device provisioning system 240 to aid the device provisioning system 240 in identifying the user and the service that requires user authentication. In one embodiment, the sign-in information comprises a device provisioning system session information that identifies the session for the request for sign-in information and a service provider identifier that identifies the service provider system 230.

The user computer 210 may comprise a general-purpose computer, such as a laptop or desktop computer, employed by the user to access online services, such as that provided by the service provider system 230. In the example of FIG. 2, the user computer 210 includes client software 211 that comprises computer-readable program code for accessing the service provided by the service provider system 230. In the example of FIG. 2, the user computer 210 sends a request to access a service provided by the service provider system 230 over the Internet connection 251, receives direction from the service provider system 230 to receive sign-in information from the device provisioning system 240, receives the sign-in information from the device provisioning system 240 over the Internet connection 252, provides the sign-in information to the portable mobile device 220 over a communications channel 253, and accesses the service provided by the service provider system 230 after a registered owner of the portable mobile device 220 has been authenticated by the service provider system 230 as an authorized user of the service.

The portable mobile device 220 may comprise a hand-held computing device, such as a smartphone (e.g., APPLE IPHONE mobile phone) or a tablet (e.g., APPLE IPAD tablet), for example. In the example of FIG. 2, the portable mobile device 220 comprises an authentication agent 221 and a unique device identifier 223. The authentication agent 221 may comprise computer-readable program code for reading data that includes the sign-in information from the user computer 210, and providing access data to the device provisioning system 240. The access data may include the device identifier 223 and the sign-in information. The authentication agent 221 may comprise a mobile application (also known as an "app") for a smartphone, for example.

In one embodiment, the device identifier 223 is a unique device identifier that directly identifies the portable mobile device 220. Unlike a username or password, which may be associated with several devices, the device identifier 223 uniquely and directly identifies the hardware of the portable mobile device 220 itself and no other devices. This allows the portable mobile device 220 to be used as a physical key for user authentication, resulting in improved security because the portable mobile device 220 cannot be easily replicated. In one embodiment, the device identifier 223 is formed by hardware-specific serial numbers (e.g., International Mobile Equipment Identity (IMEI) for smartphones, Unique Device Identifier (UDID) for iOS devices, central processing unit signatures, Media Access Control (MAC) address for Wi-Fi modules, Near Field Communication (NFC) chip tags, etc.), and may be accompanied or hashed by some user secret that is manually entered by users when registering their devices to the device provisioning system 240. In one embodiment, the portable mobile device 220 receives the sign-in information from the user computer 210 and provides the sign-in information and the unique device identifier 223 to the device provisioning system 240 over the Internet connection 254.

In one embodiment, the portable mobile device 220 includes a camera 222 for taking a picture of data 213 displayed on a display window 212 of the computer 210. As a particular example, the client software 211 may be configured to combine sign-in information received from the device provisioning system with service session information received from the service provider system 230 to generate combined data, and encode the combined data to be readable by the portable mobile device 220. In one embodiment, the service session information identifies the session for the request to access the service.

In the example of FIG. 2, the encoded combined data may be a displayable code, such as a quick response (QR) code, displayed on the display window 212 as the data 213. The portable mobile device 220 may take a picture of the data 213 to receive the data 213 for processing by the authentication agent 221. The authentication agent 221 decodes the data 213 to extract the combined data, and then uses the combined data along with the device identifier 223 to generate access data to be provided to the device provisioning system 240. In that embodiment, the communications channel 253 is simply the space between the user computer 210 and the portable mobile device 220. In other embodiments, the communications channel 253 may be a BLUETOOTH connection, WIFI connection, or other communications channel for transferring data (including the sign-in information and service session information) from the user computer 210 the portable mobile device 220.

The device provisioning system 240 may comprise one or more computers that provide a service for authenticating users based on their portable mobile device. In one embodiment, the device provisioning system 240 includes a database that associates users with particular portable mobile devices. More specifically a user may register with the device provisioning system 240 one or more particular portable mobile devices to be associated with the user. Each portable mobile device may be assigned a corresponding user identifier (ID) that is associated with the owner of the portable mobile device. A portable mobile device may be identified by its unique device identifier. In the example of FIG. 2, the user employing the user computer 210 has registered the device identifier 223 of the portable mobile device 220 to be associated with the user/owner of the portable mobile device 220. In one embodiment, the device provisioning system 240 provides sign-in information to the user computer 210 over the Internet connection 252, receives access data from the portable mobile device 220 over the Internet connection 254, and informs the service provider system 230 over an Internet connection 255 an identity of the user (e.g., user identifier) based on the device identifier 223 of the portable mobile device 220. The device provisioning system 240 may include a management interface that allows users to view their authentication request histories and to manage their registered devices. Users may employ the management interface to unregister lost or stolen devices so that authentication with those devices will be denied.

In an example operation, the user computer 210 connects to the remote service provider system 230 over the Internet connection 251. The service provider system 230 prompts the user computer 210 to authenticate by providing instructions (e.g., a message that the user can read from the display window 212) to connect to the device provisioning system 240 to get sign-in information and to generate the data 213 with proper encoding. The service provider system 230 may also provide service session information to the user computer 210. The user computer 210 connects to the device provisioning system 240 over the Internet connection 252 to receive the sign-in information. The user computer 210 receives the sign-in information, encodes the sign-in information and other access information (e.g., service session information from the service provider system 230) to generate a combined data, encodes the combined data to generate the data 213, and makes the data 213 available to the portable mobile device 220. The user then employs the portable mobile device 220 to read the data 213 over the communications channel 253. The portable mobile device 220 consolidates the device identifier 223 with data from the data 213 to generate access data, and provides the access data to the device provisioning system 240 over the Internet connection 254.

The device provisioning system 240 extracts the device identifier 223 from the access data, looks up the device identifier 223 in a database that lists the device identifiers associated with users, and notifies the service provider system 230 over the Internet connection 255 of the identity of the user. The service provider system 230 determines if the user computer 210 is authorized to access the service based on the identity of the user (e.g., by looking up the user against a listing of authorized users), and responds accordingly. For example, the service provider system 230 may allow the user computer 210 to access the service when the user as identified by the device provisioning system 240 based on the portable mobile device 220 is an authorized user of the service. Otherwise, when the user is not an authorized user of the service, the service provider system 230 may prevent the user computer 210 from accessing the service.

Figure 3:
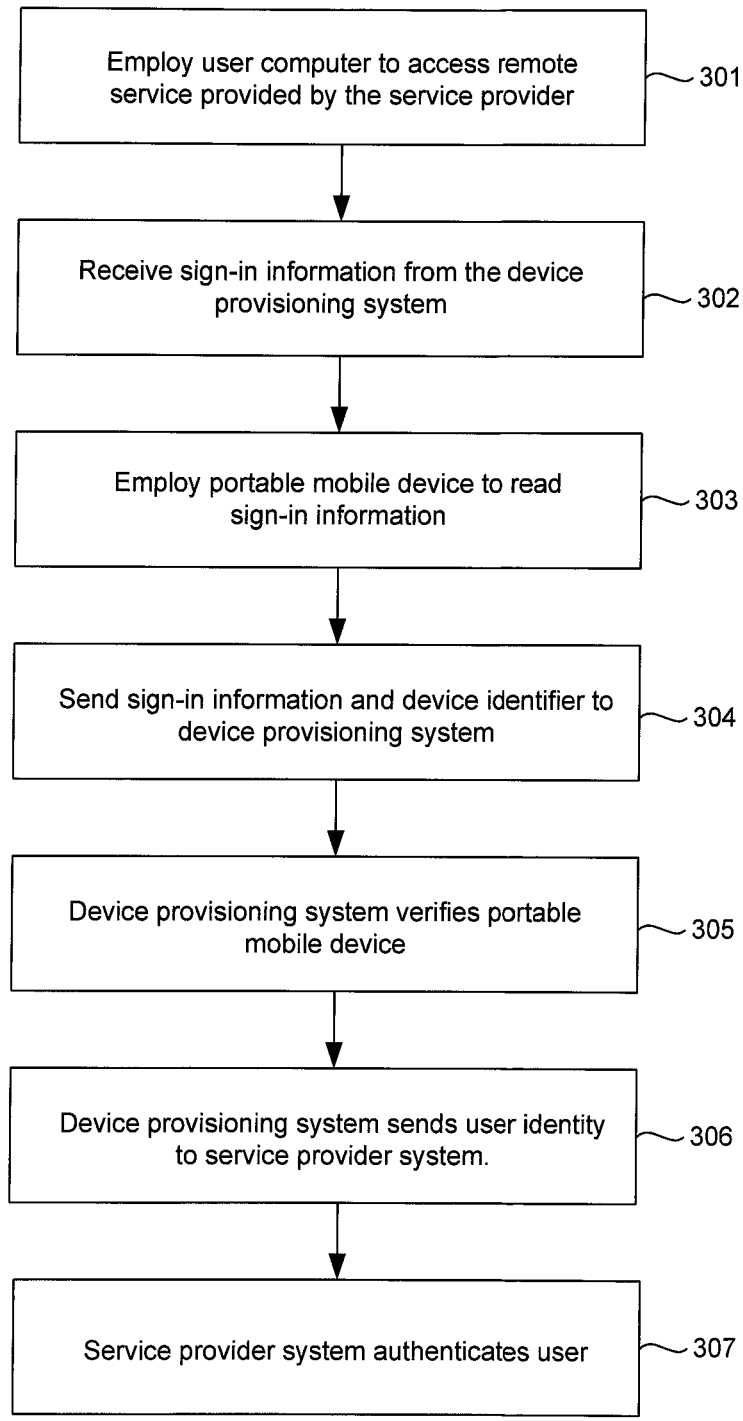
FIG. 3 shows a flow diagram of a method of authenticating a user in accordance with an embodiment of the present invention.

FIG. 3 shows a flow diagram of a method of authenticating a user in accordance with an embodiment of the present invention. The method of FIG. 3 is explained using the components of the system 200 for illustration purposes only. Other components may also be employed without detracting from the merits of the present invention.

In the example of FIG. 3, a user employs the user computer 210 to attempt accessing a restricted remote online service provided by service provider system 230 over the Internet connection 251 (step 301). When authentication is required, the service provider system 230 provides instructions to connect to the device provisioning system 240 to get sign-in information. The service provider system 230 may also provide the user computer 210 service session information that identifies the session for the access to the service. The user computer 210 connects to the device provisioning system 240 to receive the sign-in information over the Internet connection 252 (step 302). In one embodiment, the sign-in information provided by the device provisioning system 240 includes a device provisioning system session information that identifies the session for the request for sign-in information and service provider identifier hat identifies the service provider system 230. It is to be noted that the service provider identifier may also be received in the user computer 210 from the service provider system 210 implicitly (e.g., server domain name) or explicitly (e.g., a website access token). The user computer 210 may then send the service provider identifier to the device provisioning system 240 to acquire the sign-in information.

The client software 211 may be configured to receive from the service provider system 230 the service session information and the address of the device provisioning system 240, and to automatically connect to the device provisioning system 240 to receive the sign-in information in response to receiving instructions from the service provider system 230. Alternatively, the service session information and location of the device provisioning system 240 may be displayed on the user computer 210. The user may manually initiate connection to the device provisioning system 240 to receive the sign-in information in the user computer 210, and manually enter the service session information and/or sign-in information into the client software 211 or other software for generating the data 213 that is made available to the portable mobile device 220.

The sign-in information is combined with the service session information from the service provider system 240 to generate combined data, and the combined data is encoded to generate the data 213. The user then employs the portable mobile device 220 to read the data 213, which includes the sign-in information, over the communications channel 253 (step 303). As a particular example, the client software 211 may combine the service session information and sign-in information into a QR code, which is then received in the portable mobile device 220 by using the camera 222 to take a picture of the QR code.

The authentication agent 221 running in the portable mobile device 220 decodes the data 213 to get the service session information and device provisioning system session information. The authentication agent sends the decoded information, i.e., the service session information and device provisioning system session information, along with the unique device identifier 223 of the portable mobile device 222 to the device provisioning system 240 over the Internet connection 254 as access data (step 304). The device provisioning system 240 checks the portable mobile device 220 by its unique device identifier 223 to associate the request to a user ID representing the owner of the portable mobile device 220 (step 305). If the unique device identifier 223 has no corresponding user ID, the authentication process stops because the portable mobile device 220 is unknown, either because it is not registered with the device provisioning system 240 or has been unregistered, for example. Otherwise, when the portable mobile device 220 has a corresponding user ID, the device provisioning system 240 sends access information to the service provider system 230 over the Internet connection 255 (step 306). The access information sent by the device provisioning system 240 to the service provider system 230 may comprise the user ID and the service session information that is originally received from service provider system 230. The service provider system 230 performs user authentication by determining whether the user ID is associated with an authorized user (step 307). If the user ID identifies an authorized user, the service provider system 230 allows the user computer 210 to access the service. Otherwise, when the user ID does not identify an authorized user, the service provider system 230 does not provide access to the user computer 210.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of authenticating a user, the method comprising:
    receiving in a user computer a service session information from a service provider system being accessed by the user computer;
    receiving in the user computer a sign-in information from a device provisioning system that identifies a registered user of a portable mobile device based on a unique device identifier of the portable mobile device;
    generating combined data in the user computer by combining in the user computer the sign-in information received by the user computer from the device provisioning system and the service session information received by the user computer from the service provider system;
    receiving the sign-in information in the portable mobile device, the sign-in information being received by the portable mobile device from the combined data received by the portable mobile device from the user computer; and
    providing the sign-in information and the unique device identifier of the portable mobile device from the portable mobile device to the device provisioning system,
    wherein the sign-in information comprises a device provisioning system session information that identifies a session for receiving the sign-in information from the device provisioning system.

2. The method of claim 1 further comprising:
    in the service provider system, allowing the user computer access to the remote online service based on an identity of the registered user of the portable mobile device.

3. The method of claim 2 wherein the identity of the registered user of the portable mobile device is a user identifier (ID).

4. The method of claim 1 wherein the combined data comprise displayable code that is displayed on a display window of the user computer and the portable mobile device receives the combined data by taking a picture of the displayable code using a camera of the portable mobile device.

5. The method of claim 1 wherein the service session information identifies a session for accessing the remote online service provided by the service provider system.

6. The method of claim 1 wherein the portable mobile device comprises a smartphone, and the sign-in information is received by the smartphone from the user computer using a built-in camera of the smartphone.

7. A system for authenticating a user, the system comprising:
    a service provider system that receives an access request from a user computer over a first Internet connection, receives information about an identity of a user from a device provisioning system over a second Internet connection, and provides access to a its remote online service to the user computer when the user is an authorized user based on the information about the identity of the user received from the device provisioning system;
    the user computer that sends a request to access the remote online service over the first Internet connection, receives the a sign-in information from the device provisioning system over a third Internet connection, receives a service session information from the service provider system over the first Internet connection, generates combined data comprising the sign-in information and the service session information, provides the sign-in information to the a portable mobile device over a communications channel, and accesses the remote online service after the service provider system determines that the user is as an authorized user;
    the portable mobile device that receives the sign-in information from the combined data generated by the user computer and provides the sign-in information and a unique device identifier to the device provisioning system over a fourth Internet connection, the unique device identifier uniquely identifying the portable mobile device; and
    the device provisioning system that provides the sign-in information to the user computer over the third Internet connection, receives the sign-in information and the unique device identifier from the portable mobile device over the fourth Internet connection, and informs the service provider system over the second Internet connection an identity of the user based on the portable mobile device,
    wherein the sign-in information comprises a device provisioning system session information that identifies a session for receiving the sign-in information from the device provisioning system.

8. The system of claim 7 wherein the identity of the user is a user identifier (ID) provided by the device provisioning system to the service provider system based on the portable mobile device.

9. The system of claim 7 wherein the service session information identifies a session for accessing the remote online service provided by the service provider system.

10. The system of claim 7 wherein the portable mobile device comprises a smartphone, and the smartphone receives the sign-in information from the user computer by way of a built-in camera of the smartphone.

* * * * *